United States Patent
Chen et al.

(10) Patent No.: US 9,965,991 B2
(45) Date of Patent: *May 8, 2018

(54) DRIVE METHOD AND DRIVE DEVICE OF LIQUID CRYSTAL DISPLAY

(71) Applicant: Shenzhen China Star Optoelectronics Technology Co., Ltd., Shenzhen, Guangdong (CN)

(72) Inventors: Yu-yeh Chen, Guangdong (CN); Dongsheng Guo, Guangdong (CN); Jiang Zhu, Guangdong (CN); Lei Sun, Guangdong (CN); Li-Wei Chu, Guangdong (CN); Jhen-wei He, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/628,122

(22) Filed: Jun. 20, 2017

(65) Prior Publication Data

US 2017/0287416 A1 Oct. 5, 2017

Related U.S. Application Data

(62) Division of application No. 14/443,976, filed on May 19, 2015, now Pat. No. 9,715,847.

(51) Int. Cl.
| | |
|---|---|
| *G09G 5/10* | (2006.01) |
| *G09G 3/20* | (2006.01) |
| *G09G 3/36* | (2006.01) |
| *G02F 1/137* | (2006.01) |

(52) U.S. Cl.
CPC .......... *G09G 3/2003* (2013.01); *G09G 3/2018* (2013.01); *G09G 3/36* (2013.01); *G09G 3/3611* (2013.01); *G02F 1/137* (2013.01); *G09G 2300/0452* (2013.01); *G09G 2310/08* (2013.01); *G09G 2320/0646* (2013.01); *G09G 2320/0666* (2013.01)

(58) Field of Classification Search
CPC . G06F 3/02; G06F 3/041; G06F 3/045; G06F 3/042; G09G 5/00; G09G 5/10; G01R 27/26; G06K 9/00
See application file for complete search history.

(56) References Cited

U.S. PATENT DOCUMENTS

| | | | |
|---|---|---|---|
| 7,880,823 B2 * | 2/2011 | Kim | G09G 3/3651 349/144 |
| 2014/0306984 A1* | 10/2014 | Choi | G09G 5/06 345/591 |

* cited by examiner

*Primary Examiner* — Pegeman Karimi
(74) *Attorney, Agent, or Firm* — Andrew C. Cheng

(57) ABSTRACT

The present invention provides a drive method and a drive device of a liquid crystal display, and the drive method comprises: receiving an image to display; implementing block detection to the image pixels of the image to display to determine dimensions of color blocks where the image pixels are; respectively setting block weights for the respective image pixels according to the dimensions of the color blocks; implementing the color washout compensation to the image to display according to the block weight; driving the liquid crystal panel to show the image to display after the color washout compensation. With the aforesaid arrangement, the present invention can reduce the color washout under large view angle to promote the display effect of the large view angle.

8 Claims, 7 Drawing Sheets

DRIVE METHOD AND DRIVE DEVICE OF LIQUID CRYSTAL DISPLAY

CROSS REFERENCE TO RELATED APPLICATIONS

This is a divisional application of co-pending patent application Ser. No. 14/443,976, filed on May 19, 2015, which is a national stage of PCT Application Number PCT/CN2015/074724, filed on Mar. 20, 2015, claiming foreign priority of Chinese Patent Application Number 201510103490.2, filed on Mar. 9, 2015.

FIELD OF THE INVENTION

The present invention relates to a display technology field, and more particularly to a drive method and a drive device of a liquid crystal display.

BACKGROUND OF THE INVENTION

Compared with traditional CRT displays, the liquid crystal displays possess advantages, such as low power consumption, light weight, stable screen, great screen color effect, etc., which is the main development direction of the present market.

The liquid crystal display mainly is to inject liquid crystal between two transparent electrode substrates, and then to control the alignment of liquid crystal molecules by applying voltage to the electrode substrates or not, and thus to stop the light passing through the liquid crystal layer or allow the light passing through the liquid crystal layer for achieving the gray scale display. Nevertheless, with the optical anisotropy property of the liquid crystal molecules, the color washout issue under large view angle commonly exists for the liquid crystal display. Even the miscolored pictures can be easily seen under large view angle, it still reduces the large view angle watch effect of the liquid crystal display.

SUMMARY OF THE INVENTION

On this account, the technical issue that the embodiment of the present invention solves is to provide a drive method and a drive device of a liquid crystal display, which is capable of reducing the color washout under large view angle to promote the display effect of the large view angle.

For solving the aforesaid technical issue, the technical solution employed by the present invention is: providing a drive method of a liquid crystal display, and the drive method comprises: receiving an image to display; implementing block detection to the image pixels of the image to display to determine dimensions of color blocks where the image pixels are; respectively setting block weights for the respective image pixels according to the dimensions of the color blocks; implementing the color washout compensation to the image to display according to the block weight; the step of implementing color washout compensation to the image to display according to the block weight comprises: employing the original gray scale values of the respective primary color components of the respective image pixels of the image to display to respectively generate the first display gray scale value and the second display gray scale value, wherein the first display gray scale value and the second display gray scale value are employed to respectively control display brightnesses of two display pixels of the same color on the liquid crystal panel, and the first display gray scale value is larger than the second display gray scale value, wherein the block weights are employed to set the ratio of the first display gray scale value and the second display gray scale value, to make that the ratio of the first display gray scale value and the second display gray scale value is smaller as the color block is smaller; driving the liquid crystal panel to show the image to display after the color washout compensation; wherein a sum of the display brightness corresponded with the first display gray scale value and the display brightness corresponded with the second display gray scale value is twice of display brightness corresponded with the original display gray scale value; before the step of driving the liquid crystal panel to show the image to display after the color washout compensation, the method further comprises: implementing skin color detection to the image pixels of the image to display to determine nude pixel and non skin color pixel; implementing color washout compensation to the image to display according to the skin color weights, wherein the skin color weights are employed to set the ratio of the first display gray scale value and the second display gray scale value, to make a ratio of the first display gray scale value and the second display gray scale value of the nude pixel larger than a ratio of the first display gray scale value and the second display gray scale value of the non skin color pixel.

Specifically, the step of employing the first display gray scale value and the second display gray scale value to respectively control display brightnesses of two display pixels of the same color on the liquid crystal panel comprises: controlling at least two display pixels on the liquid crystal panel controlled by at least two first display gray scale values to be adjacently aligned along the row direction or the column direction.

For solving the aforesaid technical issue, another technical solution employed by the present invention is: providing a drive method of a liquid crystal display, and the drive method comprises: receiving an image to display; implementing block detection to the image pixels of the image to display to determine dimensions of color blocks where the image pixels are; respectively setting block weights for the respective image pixels according to the dimensions of the color blocks; implementing the color washout compensation to the image to display according to the block weight; driving the liquid crystal panel to show the image to display after the color washout compensation.

The step of implementing color washout compensation to the image to display according to the block weight comprises: employing the original gray scale values of the respective primary color components of the respective image pixels of the image to display to respectively generate the first display gray scale value and the second display gray scale value, wherein the first display gray scale value and the second display gray scale value are employed to respectively control display brightnesses of two display pixels of the same color on the liquid crystal panel, and the first display gray scale value is larger than the second display gray scale value, wherein the block weights are employed to set the ratio of the first display gray scale value and the second display gray scale value, to make that the ratio of the first display gray scale value and the second display gray scale value is smaller as the color block is smaller.

The drive device further comprises a skin color detection module, and the skin color detection module is employed for implementing skin color detection to the image pixels of the image to display to determine nude pixel and non skin color pixel, and setting different skin color weights for the nude pixel and the non skin color pixel before employing the original gray scale values of the respective primary color components of the respective image pixels of the image to display to respectively generate the first display gray scale value and the second display gray scale value; the color washout compensation module further employs the skin color weights to set the ratio of the first display gray scale value and the second display gray scale value, to make a ratio of the first display gray scale value and the second display gray scale value of the nude pixel larger than a ratio of the first display gray scale value and the second display gray scale value of the non skin color pixel.

The step of implementing skin color detection to the image pixels of the image to display comprises: acquiring original gray scale values of red, green, blue, three primary colors of the respective image pixels; the image pixels satisfying the following equation are defined to be nude pixels, and the image pixels not satisfying the following equation are defined to be non skin color pixels: LR>LG>LB, wherein LR, LG, LB respectively are the original gray scale values of the red, green, blue, three primary colors.

The step of implementing color washout compensation to the image to display according to the skin color weight comprises: setting a ratio of the first display gray scale value and the second display gray scale value of different primary color components of the same nude pixel as being different.

Before the step of driving the liquid crystal panel to show the image to display after the color washout compensation, the method further comprises: implementing high frequency detection to the image pixels of the image to display to determine color differences of the respective image pixels and the adjacent image pixels; respectively setting block weights for the respective image pixels according to the dimensions of the color blocks; employing the high frequency weights to implement color washout compensation to the image to display, wherein the high frequency weights are employed to set the ratio of the first display gray scale value and the second display gray scale value, to make that the ratio of the first display gray scale value and the second display gray scale value is smaller as the color difference is larger.

The step of implementing high frequency detection to the image pixels of the image to display comprises: calculating absolute differences of the original gray scale values of the respective primary color components of the respective image pixels and the adjacent image pixels, and summing the absolute differences to acquire different gray scale sum values for different adjacent image pixels; selecting the maximum gray scale sum value in the gray scale sum values to represent the color difference.

The step of implementing block detection to the image pixels of the image to display comprises: summing the skin color weights or the high frequency weights of the image pixels in predetermined areas around the respective image pixels to acquire weight sum value to acquire the weight sum value, and employing the weight sum value to represent the dimensions of the color blocks where the image pixels are.

The color skin weight of the nude pixel is larger than the color skin weight of the non skin color pixel, and the high frequency weight is smaller as the color difference is larger; the step of implementing color washout compensation to the image to display according to the block weight comprises: the ratio of the first display gray scale value and the second display gray scale value is smaller as the weight sum value is smaller.

For solving the aforesaid technical issue, another technical solution employed by the present invention is: providing a drive device of a liquid crystal display, comprising a receiving module, receiving an image to display; a block detection module, implementing block detection to the image pixels of the image to display to determine dimensions of color blocks where the image pixels are, and respectively setting block weights for the respective image pixels according to the dimensions of the color blocks; a color washout compensation module, implementing color washout compensation to the image to display according to the block weight; a drive module, driving the liquid crystal panel to show the image to display after the color washout compensation.

The color washout compensation module employs the original gray scale values of the respective primary color components of the respective image pixels of the image to display to respectively generate the first display gray scale value and the second display gray scale value, wherein the first display gray scale value and the second display gray scale value are employed to respectively control display brightnesses of two display pixels of the same color on the liquid crystal panel, and the first display gray scale value is larger than the second display gray scale value, wherein the block weights are employed to set the ratio of the first display gray scale value and the second display gray scale value, to make that the ratio of the first display gray scale value and the second display gray scale value is smaller as the color clock is smaller.

The drive device further comprises a skin color detection module, and the skin color detection module is employed for implementing skin color detection to the image pixels of the image to display to determine nude pixel and non skin color pixel, and setting different skin color weights for the nude pixel and the non skin color pixel before the drive module drives the liquid crystal panel to show the image to display after the color washout compensation; the color washout compensation module is further employed for implementing color washout compensation to the image to display according to the skin color weights, wherein the skin color weights are employed to set the ratio of the first display gray scale value and the second display gray scale value, to make a ratio of the first display gray scale value and the second display gray scale value of the nude pixel larger than a ratio of the first display gray scale value and the second display gray scale value of the non skin color pixel.

The skin color detection module is employed to acquire original gray scale values of red, green, blue, three primary colors of the respective image pixels, and the image pixels satisfying the following equation are defined to be nude pixels, and the image pixels not satisfying the following equation are defined to be non skin color pixels: LR>LG>LB, wherein LR, LG, LB respectively are the original gray scale values of the red, green, blue, three primary colors.

The color washout compensation module is employed for setting a ratio of the first display gray scale value and the second display gray scale value of different primary color components of the same nude pixel as being different.

The drive device further comprises a high frequency detection module, and the high frequency detection module is employed for implementing high frequency detection to the image pixels of the image to display to determine color differences of the respective image pixels and the adjacent image pixels, and respectively setting block weights for the respective image pixels according to the dimensions of the color blocks before the drive module drives the liquid crystal panel to show the image to display after the color washout compensation; the color washout compensation module is further employed to implement the color washout compensation, wherein the high frequency weights are employed to set the ratio of the first display gray scale value and the second display gray scale value, to make that the ratio of the first display gray scale value and the second display gray scale value is smaller as the color difference is larger.

The high frequency detection module is employed for calculating absolute differences of the original gray scale values of the respective primary color components of the respective image pixels and the adjacent image pixels, and summing the absolute differences to acquire different gray scale sum values for different adjacent image pixels, and selecting the maximum gray scale sum value in the gray scale sum values to represent the color difference.

The block detection module is employed for summing the skin color weights or the high frequency weights of the image pixels in predetermined areas around the respective image pixels to acquire weight sum value, and employing the weight sum value to represent the dimensions of the color blocks where the image pixels are.

The color skin weight of the nude pixel is larger than the color skin weight of the non skin color pixel, and the high frequency weight is smaller as the color difference is larger; the color washout compensation module is employed for making that the ratio of the first display gray scale value and the second display gray scale value is smaller as the weight sum value is smaller.

With the aforesaid technical solutions, the benefits obtained from the embodiments of the present inventions are: by implementing block detection to the image to display for respectively setting the block weights to the image pixels according to the dimensions of the color blocks where the image pixels are, and employing the block weight to implement the color washout compensation to the image to display, it is beneficial for reducing the color washout under large view angle to make the screen effect watched from the large view angle and the screen effect watched right in front are basically the same to promote the display quality.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are merely part of embodiments of the present invention, but not all embodiments. Based on the embodiments of the present invention, all other embodiments to those of ordinary skill in the premise of no creative efforts obtained, should be considered within the scope of protection of the present invention.

Figure 1:
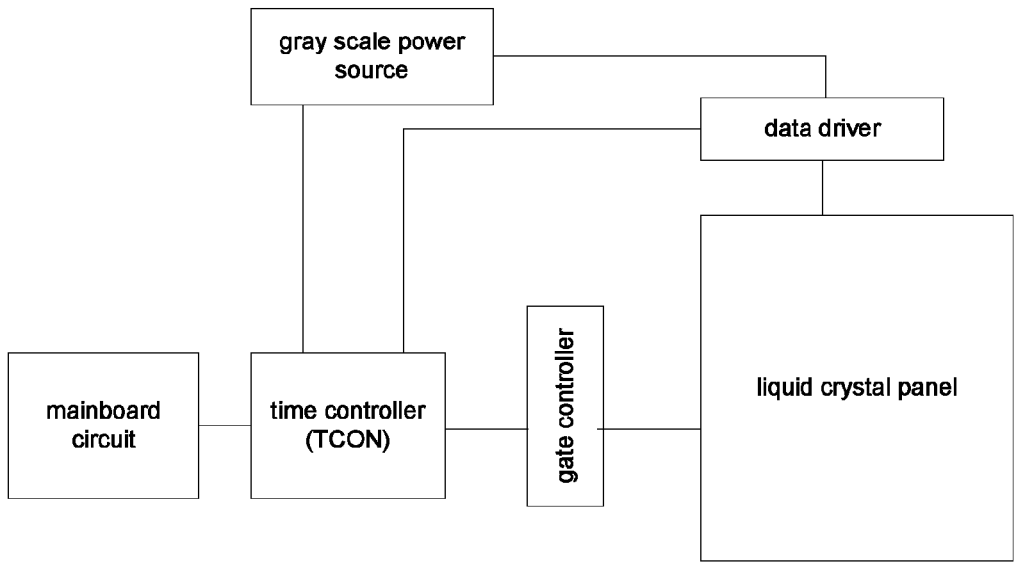
FIG. 1 is a structural diagram of a drive system of a liquid crystal display.

A brief explanation for the drive system of the liquid crystal display is proceeded before introducing the drive method of the liquid crystal display according to the present invention. As shown in FIG. 1, in the drive system of the liquid crystal display, the image data is transmitted by the mainboard circuit to the time controller TCON, and then is transmitted to the data driver after the process of the time controller TCON. Meanwhile, the time controller TCON remains to receives the vertical synchronizing signal (Vsyn), the horizontal synchronizing signal (Hsyn), data transmission clock (DCK) and the data enable signal (DEN) transmitted from the mainboard circuit and generates kinds of control signals for controlling functions of the gray scale power source, data driver and gate controller based on these signals. The gray scale power source generates gray scale voltages according to the control signals transmitted by the time controller and transmits the same to the data driver. Thus, the time controller TCON processes the data from the mainboard circuit to obtain the gray scale signals on the liquid crystal display and to drive the liquid crystal panel.

Figure 2:
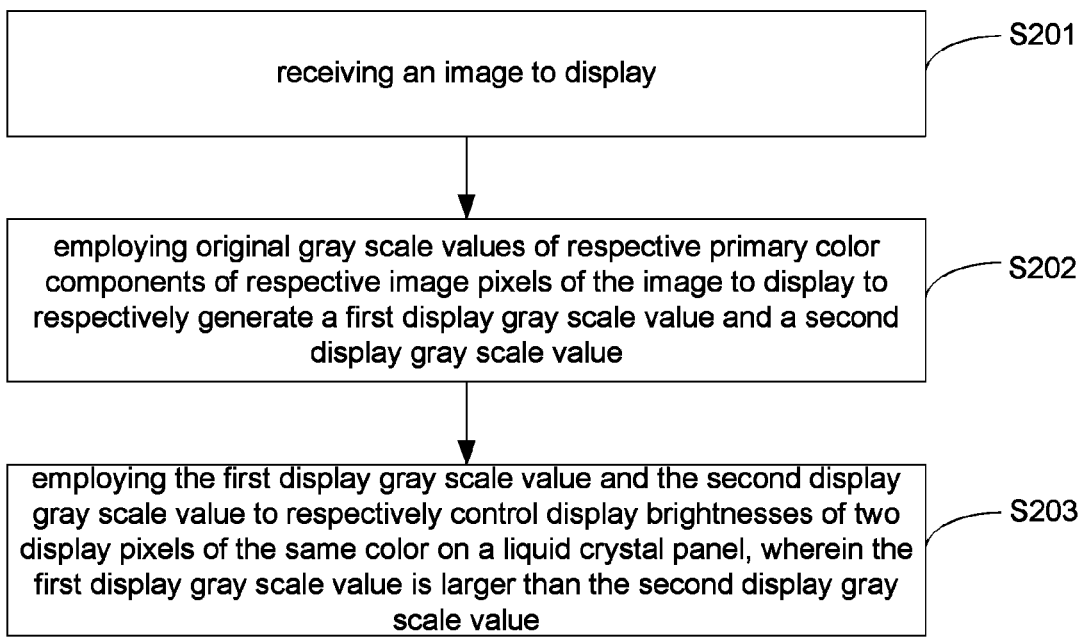
FIG. 2 is a flowchart of a drive method of a liquid crystal display according to one embodiment of the present invention.

Please refer to FIG. 2. The drive method of the liquid crystal panel according to one embodiment of the present invention comprises steps of:

step S201: receiving an image to display.

step S202, employing original gray scale values of respective primary color components of respective image pixels of the image to display to respectively generate a first display gray scale value and a second display gray scale value.

step S203, employing the first display gray scale value and the second display gray scale value to respectively control display brightnesses of two display pixels of the same color on a liquid crystal panel, wherein the first display gray scale value is larger than the second display gray scale value.

One frame of image generally comprises a plurality of image pixels. Each image pixel comprises red (R), green (G), blue (B), three color components, and the display brightness of each image pixel is the mixture of the display brightnesses of the corresponding primary color components. As driving one frame of image to display, by providing a gray scale value required for display to each primary color component of each image pixel, the brightness of the primary color component is controlled to make the primary color component display the corresponding color, and thus realize the display of the image. Therefore, the step of receiving the image to display specifically is to receive the related data of the respective image pixels of the image to display, including the original gray scale values of the respective primary color components.

After receiving the original gray scale values of the respective primary color components of one image pixel, the original gray scale values of the respective primary color components are employed to respectively generate a first display gray scale value and a second display gray scale value to respectively control display brightnesses of two display pixels of the same color on the liquid crystal panel.

In this embodiment and in the pixel structure of the liquid crystal panel, two display pixels are employed to realize the display brightness of one primary color component. That is to say, the display brightness of each primary color component is the mixture of the display brightnesses of two display pixels on the liquid crystal panel. The two display pixels refer to two independent pixels spatially arranged on the liquid crystal panel. The display pixel is a display unit defined by respective color resist units. The color resist units comprise a red resist unit, a green resist unit and a blue resist unit. The display pixel correspondingly comprises a red display pixel, a green display pixel and a blue display pixel. Therefore, each primary color component respectively corresponds to two display pixels of the same color. Specifically, in one image pixel, the red component corresponds to two red display pixels, and the green component corresponds to two green display pixels, and the blue component corresponds to two blue display pixels. The two display pixels of the same color of the same primary color component are mutually independent. The display pixels of different colors of the different primary color components are independent to one another, too.

The first display gray scale value generated by the original gray scale value is larger than the second display gray scale value. Thus, as employing the first display gray scale value and the second display gray scale value to respectively control the display brightnesses of the two corresponding display pixels of the same color, the drive voltages applied to the two display pixels are different to twist the liquid crystal molecules of respective display pixels in different angles. Accordingly, the better watch result can be obtained anyway as watching the frame of the image from different angles to achieve the objective of reducing the color washout.

Besides, the two display pixels of the same color corresponding to respective primary color component in this embodiment are display units which are mutually independent, and thus are capable of independently controlling the brightnesses of respective display pixels to allow the display brightnesses of respective display pixels to change between 0-255. It is beneficial for promoting the aperture ratio of the liquid crystal panel.

The specific step of employing the original gray scale values of the primary color components to generate the first display gray scale value and the second display gray scale value comprises: setting a sum of the display brightness corresponded with the first display gray scale value and the display brightness corresponded with the second display gray scale value as being twice of display brightness corresponded with the original display gray scale value. Specifically, by setting the first display gray scale value and the second display gray scale value, the sum of the display brightness corresponded with the first display gray scale value and the display brightness corresponded with the second display gray scale value can be twice of display brightness corresponded with the original display gray scale value. Thus, in this embodiment, the relationship of the display brightness of every primary color component and the brightnesses of the two corresponding display pixels of the same color is:

$$Lx=(Ly+Lz)/2$$

Lx represents the brightness of the primary color component. Ly represents the brightness of the display pixel controlled by the first gray scale value which is a larger display gray scale value. Lz represents the brightness of the display pixel controlled by the second gray scale value which is a smaller display gray scale value.

The specific step of employing the original gray scale values of the primary color components to generate the first display gray scale value and the second display gray scale value further comprises: setting a ratio of the first display gray scale value and the second display gray scale value of different primary color components of the same image pixel as being different.

In this embodiment, by adjusting the first display gray scale value and the second display gray scale value of the primary color component, the first display gray scale value, the second display gray scale value and their ratio can satisfy the aforesaid demands to realize implementing the color washout compensation to the image to display and a better low color washout result can be obtained.

In the embodiment of the drive method for the liquid crystal display according to the present invention, except adjusting the first display gray scale value and the second display gray scale value, the spatial arrangement of bright, dark display pixels is further combined for implementing color washout compensation to the image to display. Specifically, the step of employing the first display gray scale value and the second display gray scale value to respectively control display brightnesses of two display pixels of the same color on the liquid crystal panel comprises: controlling at least two display pixels on the liquid crystal panel controlled by at least two first display gray scale values to be adjacently aligned along the row direction or the column direction.

Figure 3:
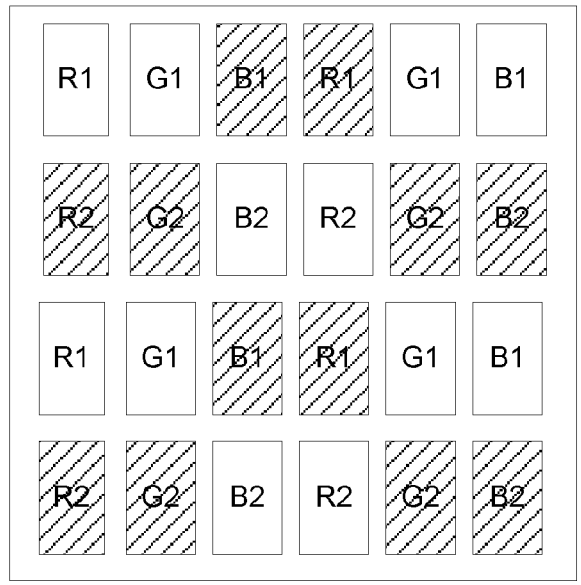
FIG. 3 is an arrangement diagram of at least two display pixels controlled by at least two first display gray scale values in one embodiment of the drive system of the liquid crystal display according to the present invention.

The display pixel controlled by the first display gray scale value which is larger has brighter display brightness. The display pixel controlled by the second display gray scale value which is smaller has darker display brightness. Therefore, the respective display units on the liquid crystal panel appear to be bright, dark alignment. In this embodiment, the display pixels in two primary color components which has brighter display brightness are adjacently aligned in the row direction. As shown in FIG. 3, the red component R of one image pixel corresponds to two display pixels R1, R2 of the same color, wherein the first display gray scale value of the red component R controls the display brightness of the display pixel R1, and the second display gray scale value of the red component R controls the display brightness of the display pixel R2; the green component G corresponds to two display pixels G1, G2 of the same color, wherein the first display gray scale value of the green component G controls the display brightness of the display pixel G1, and the second display gray scale value of the green component G controls the display brightness of the display pixel G2; the blue component B corresponds to two display pixels B1, B2 of the same color, wherein the first display gray scale value of the blue component B controls the display brightness of the display pixel B1, and the second display gray scale value of the blue component B controls the display brightness of the display pixel B2. As shown in FIG. 3, in the row direction, the two brighter display pixels respectively corresponding to the two primary color components are adjacently aligned, and the two darker display pixels are adjacently aligned, too. Besides, two brighter display pixels and two darker display pixels are alternately aligned.

With the aforesaid alignment, it is beneficial to promote low color washout result under large view angle in comparison with the alignment that one is bright and one is dark.

Certainly, in other embodiments, the brighter display pixels respectively corresponding to the three or more primary color components can be controlled to be adjacently aligned in the row direction or in the column direction.

Figure 4:
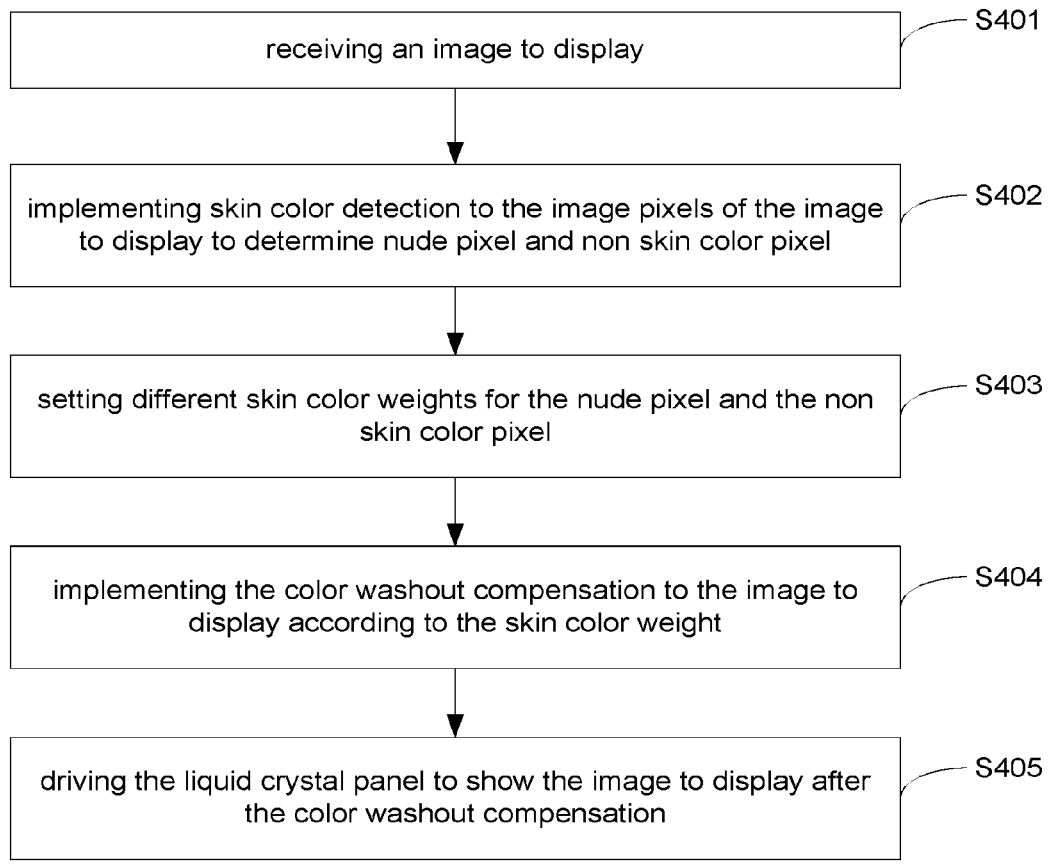
FIG. 4 is a flowchart of a drive method of a liquid crystal display according to another embodiment of the present invention.

On the basis of the foundation of aforesaid drive method, the present invention further provides a color washout compensation method based on skin color detection shown in FIG. 4. It is completely understandable to people who are skilled in this field, that the aforesaid color washout compensation method based on skin color detection also can be applied to other drive methods which is not disclosed by the drive method shown in FIG. 2. The color washout compensation method on the basis of skin color detection specifically comprises steps below:

step S401: receiving an image to display.

step S402: implementing skin color detection to the image pixels of the image to display to determine nude pixel and non skin color pixel.

implementing skin color detection to the image pixels before employing original gray scale values of respective primary color components of respective image pixels of the image to display to respectively generate a first display gray scale value and a second display gray scale value.

The nude pixels refer to the image pixels of which the display color is the same or similar with the skin color of the human. Each time, as one image pixel is received, the skin color detection is implemented to the image pixel to determine if the image pixel is a nude pixel. Specifically, the step of implementing skin color detection to the image pixels in the image to display is, acquiring original gray scale values LR, LG, LB of red, green, blue, three primary colors of the respective image pixels, and then determining if the original gray scale values LR, LG, LB of red, green, blue, three primary colors satisfy the condition, LG>LR>LB, and as the condition is met, the image pixel meeting the condition is defined to be a nude pixel, otherwise, is defined to be a non skin color pixel.

Certainly, in other embodiments, the human face detection technology or other image process technologies can be utilized for detecting the nude pixels in the image to display.

step S403: setting different skin color weights for the nude pixel and the non skin color pixel.

In this embodiment, different skin color weights are set for the nude pixel and the non skin color pixel for implementing different adjustments to the display brightnesses of the respective primary color components of the nude pixels and the non skin color pixels. The skin color weight refers to adjustment coefficients for implementing adjustment to ratios of the first display gray scale values and the second display gray scale values of the respective primary color components of the image pixel.

step S404: implementing the color washout compensation to the image to display according to the skin color weight.

After employing the original gray scale values of the respective primary color components of the respective image pixels of the image to display to respectively generate the first display gray scale value and the second display gray scale value, the skin color weight is employed to implement adjustment to ratios of the first display gray scale values and the second display gray scale values of the respective primary color components of the nude pixels and non skin color pixels to realize the objective of improving the color washout. Specifically, the skin color weight is employed to set the ratio of the first display gray scale value and the second display gray scale value to make a ratio of the first display gray scale value and the second display gray scale value of the nude pixel larger than a ratio of the first display gray scale value and the second display gray scale value of the non skin color pixel.

In this embodiment, the relationship between the skin color weight and the ratio of the first display gray scale value and the second display gray scale value is a proportional relationship. The larger the skin color weight is, the obtained ratio of the first display gray scale value and the second display gray scale value after employing the skin color weight to set the ratio of the first display gray scale value and the second display gray scale value is larger. Accordingly, the difference of the brightness between the display pixel controlled by the first display gray scale value and the display pixel controlled by the second display gray scale value is larger. On the contrary, the smaller the skin color weight is, the difference is smaller.

In one embodiment of the present invention, the skin color weight of the nude pixel is set to be larger than the skin color weight of the non skin color pixel. Thus, the ratio of the first display gray scale value and the second display gray scale value of the nude pixel is larger than the ratio of the first display gray scale value and the second display gray scale value of the non skin color pixel to make that the difference of the display brightnesses of the two display pixels of the same color respectively corresponded with the respective primary color components of the nude pixel larger than the difference of the display brightnesses of the two display pixels of the same color respectively corresponded with the respective primary color components of the non skin color pixel. Thereby, it is beneficial to promote low color washout result.

When the skin color weight is 1, no adjustment is implemented to the ratio of the first display gray scale value and the second display gray scale value of the respective primary color components of the image pixel. The two display pixels of the same color respectively corresponded with the respective primary color components of the image pixel remain to be driven according to the ratio of the original first display gray scale value and the original second display gray scale value. Therefore, in this embodiment, the skin color weight of the nude pixel can be set to be larger than 1, and the skin color weight of the non skin color pixel can be set to be 1. In this embodiment, no adjustment is implemented to the ratio of the first display gray scale value and the second display gray scale value of the respective primary color components of the non skin color pixel so that the two display pixels of the same color respectively corresponded with the respective primary color components of the non skin color pixel remain to be driven according to the ratio of the original first display gray scale value and the original second display gray scale value.

Because the human eyes have higher sensitivity to the skin color. Even smaller color washout occurs to the skin color, the human eyes can become aware of the color change of the skin color very easily. Thus, once the color washout occurs to the skin color, even the color washout is smaller, the human eyes can become aware of the color distortion of the image very easily. Therefore, in this embodiment, before employing the first display gray scale value and the second display gray scale value to respectively control the display brightnesses of two display pixels of the same color corresponded with the corresponding primary color components, the larger skin color weight is employed to set the ratio of the first display gray scale value and the second display gray scale value of the respective primary color components to implement the color washout compensation to the nude image in the image to display for acquiring better low color washout result. The screen effect watched from the large view angle can be closer to the screen watched right in front to realize the objective of reducing the color washout under large view angle. Meanwhile, no adjustment is implemented to the ratio of the first display gray scale value and the second display gray scale value of the respective primary color components of the non skin color pixels in this embodiment. Compared with the compensation method for the whole gamut, a better screen display result can be obtained.

In other embodiments, the skin color weight of the non skin color pixel can be set to be arbitrary value according to actual demands. For example, it can be set to be 0.5, 0.8 or 0.9. Or, it can be set to be larger than the skin color weight of the nude pixel. For example, it can be set to be 1.2, 1.3 or 2.0. The larger the skin color weight is, the larger the ratio of the first display gray scale value and the second display gray scale value is. The difference of the display brightnesses of the two display pixels of the same color corresponded with the primary color component becomes larger. Besides, the skin color weight of the nude pixel can be set to be arbitrary value, too. For example, it can be set to be 1.5 or 2.5. Or, it can be a value smaller than 1, such as 0.2, 0.6 or 0.7. Specifically, it can be selected according to actual demands. No restriction is claimed here.

Besides, in other embodiments, the skin color weight of the nude pixel can be set to be smaller than the skin color weight of the non skin color pixel. Then, the relationship between the skin color weight and the ratio of the first display gray scale value and the second display gray scale value is an inverse relationship. The larger the skin color weight is, the obtained ratio of the first display gray scale value and the second display gray scale value after employing the skin color weight to set the ratio of the first display gray scale value and the second display gray scale value is smaller. Accordingly, the difference of the brightness between the display pixel controlled by the first display gray scale value and the display pixel controlled by the second display gray scale value is smaller. On the contrary, the smaller the skin color weight is, the obtained ratio of the first display gray scale value and the second display gray scale value after employing the skin color weight to set the ratio of the first display gray scale value and the second display gray scale value is larger. Therefore, the ratio of the first display gray scale value and the second display gray scale value of the nude pixel can be made to be larger than the ratio of the first display gray scale value and the second display gray scale value of the non skin color pixel.

step S405: driving the liquid crystal panel to show the image to display after the color washout compensation.

After employing the skin color weight to set the ratio of the first display gray scale value and the second display gray scale value of respective primary color components, the first display gray scale value and the second display gray scale value are employed to respectively control display brightnesses of two display pixels of the same color on the liquid crystal panel, furthermore, to control at least two display pixels on the liquid crystal panel controlled by at least two first display gray scale values to be adjacently aligned along the row direction or the column direction.

For acquiring better color washout compensation result, in this embodiment, before the step of employing the original gray scale values of the respective primary color components of the respective image pixels of the image to display to respectively generate the first display gray scale value and the second display gray scale value, the method further comprises: implementing adjustment to the original gray scale values of the respective primary color components of the nude pixel to make that a difference between a relatively higher original gray scale value and a relatively lower original gray scale value before adjustment becomes larger after adjustment for the same nude pixel.

As regarding the specific adjustment, the relatively higher original gray scale value can be increased in advance. Or, the relatively lower original gray scale value can be decreased in advance. Or, the relatively higher original gray scale value can be increased in advance and the relatively lower original gray scale value can be decreased in advance. Thus, the difference between the relatively higher original gray scale value and the relatively lower original gray scale value before adjustment becomes larger after adjustment. Thereby, in the same nude pixel, the difference of the brightness between the primary color component with the relatively higher original gray scale value and the primary color component with the relatively lower original gray scale value becomes larger in advance to raise the brightness contrast of the respective primary color components. Accordingly, the color washout process result of the nude block can be better to promote the low color washout result.

Figure 5:
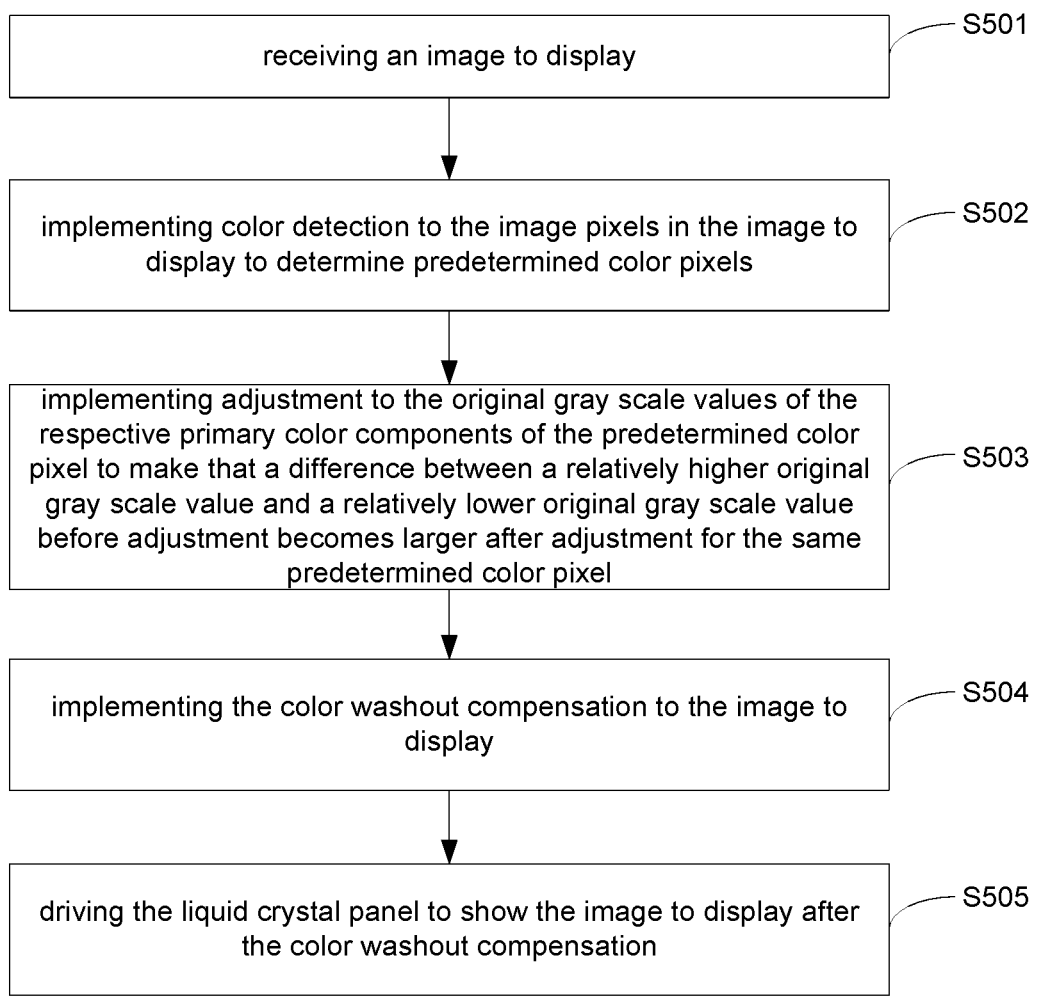
FIG. 5 is a flowchart of a drive method of a liquid crystal display according to another embodiment of the present invention.

Certainly, as people who are skilled in this field can understand, the adjustment based on the original gray scale also can be applied to the color washout compensation for other color pixels or other color washout compensation methods. Therefore, the present invention further provides a color washout compensation method based on the original gray scale, specifically shown in FIG. 5:

step S501: receiving an image to display.

step S502: implementing color detection to the image pixels in the image to display to determine predetermined color pixels.

The predetermined color pixels can be the color pixels possessing bigger influence to the screen effect, such as red pixels, green pixels or nude pixels. The predetermined color pixels in the image pixels can be determined according to the gray scale variation rules of different colors.

step S503: implementing adjustment to the original gray scale values of the respective primary color components of the predetermined color pixel to make that a difference between a relatively higher original gray scale value and a relatively lower original gray scale value before adjustment becomes larger after adjustment for the same predetermined color pixel.

Before the step of employing the original gray scale values of the respective primary color components of the respective image pixels of the image to display to respectively generate the first display gray scale value and the second display gray scale value, adjustment to the original gray scale values of the respective primary color components of the predetermined color pixel is implemented for being beneficial to improve the color washout effect.

step S504: implementing the color washout compensation to the image to display.

After implementing adjustment to the original gray scale value, the color washout compensation can be implemented to the image to display according to the aforesaid step S202.

step S505: driving the liquid crystal panel to show the image to display after the color washout compensation.

Specifically, the first display gray scale value and the second display gray scale value are employed to respectively control display brightnesses of two display pixels of the same color on the liquid crystal panel.

In the aforesaid color washout compensation method, the ratio of the first display gray scale value and the second display gray scale value different primary color components of the same image pixel can be set to be the same. Certainly, for acquiring better color washout compensation result for skin color, different weights can be applied to different primary color components of the same image pixel according to the color skin detection result for setting a ratio of the first display gray scale value and the second display gray scale value of different primary color components of the same image pixel as being different. Consequently, the adjustment can be implemented to respective primary color components individually for achieving the better color washout compensation result.

Figure 6:
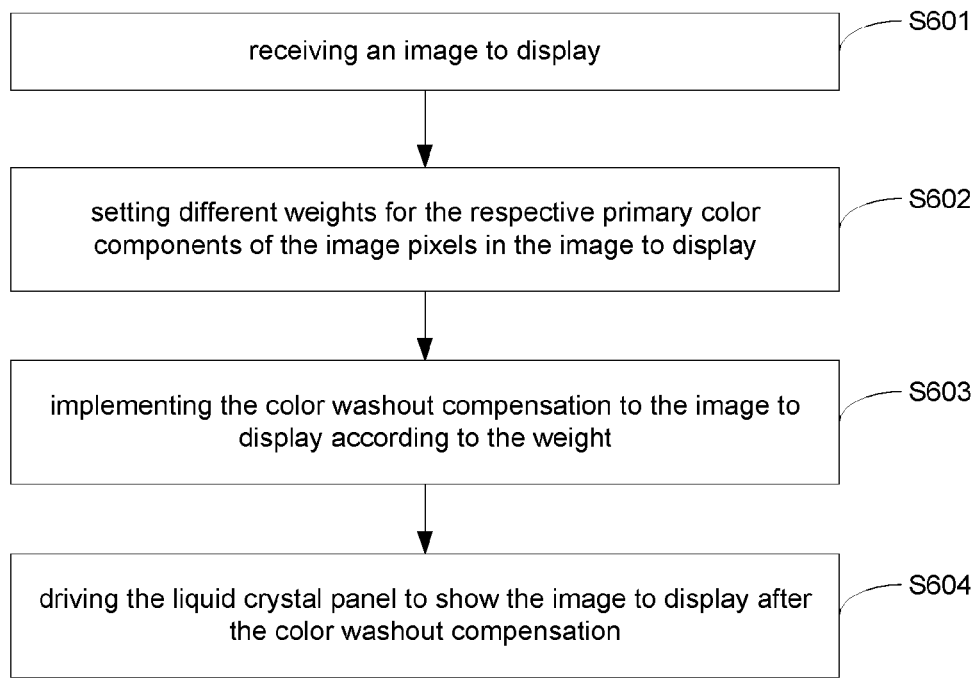
FIG. 6 is a flowchart of a drive method of a liquid crystal display according to another embodiment of the present invention.

Certainly, as people who are skilled in this field can understand, the adjustment based on the primary color component also can be applied to the color washout compensation for other color pixels or other color washout compensation methods. Therefore, the present invention further provides a color washout compensation method based on the primary color component, specifically shown in FIG. 6:

step S601: receiving an image to display.

step S602: setting different weights for the respective primary color components of the image pixels in the image to display.

step S603: implementing the color washout compensation to the image to display according to the weight.

By setting different weights for the respective primary color components of the image pixel in the image to display, and after employing the original gray scale value of the primary color component to generate the first display gray scale value and the second display gray scale value, the weights of respective primary color components are employed to set the ratio of the first display gray scale value and the second display gray scale value for setting the ratio of the first display gray scale value and the second display gray scale value of different primary color components of the same image pixel as being different.

step S604: driving the liquid crystal panel to show the image to display after the color washout compensation.

Specifically, after setting the ratio of the first display gray scale value and the second display gray scale value of different primary color components of the same image pixel to be different, the first display gray scale value and the second display gray scale value are employed to respectively control display brightnesses of two display pixels of the same color on the liquid crystal panel.

Figure 7:
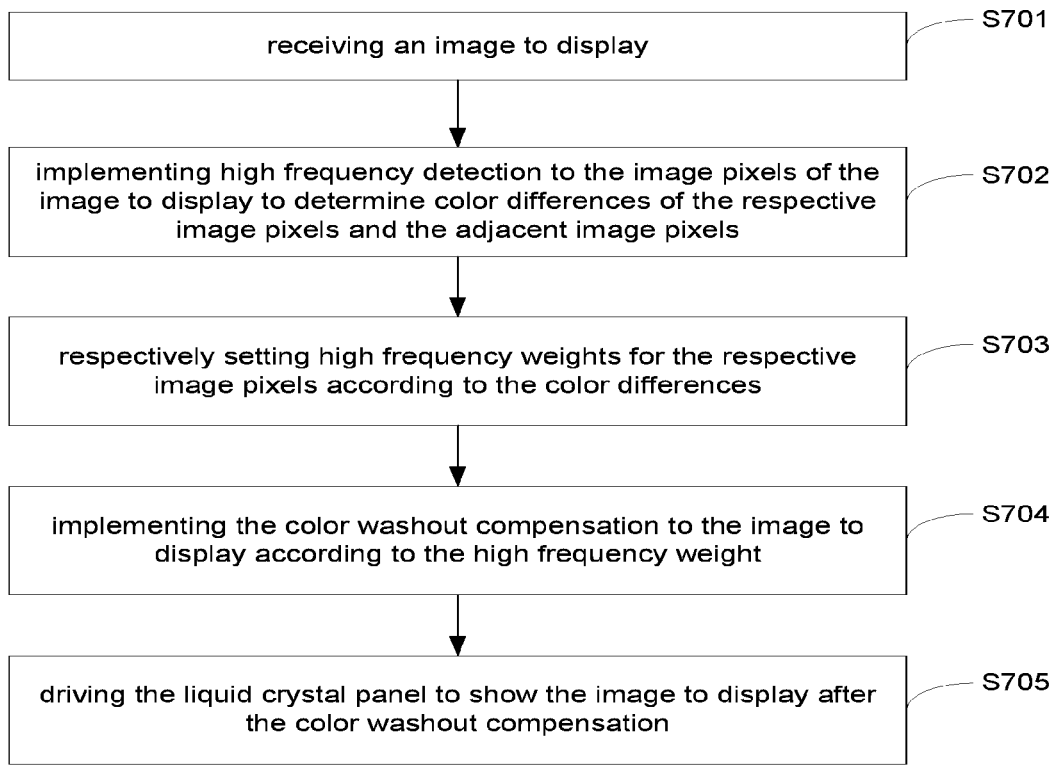
FIG. 7 is a flowchart of a drive method of a liquid crystal display according to another embodiment of the present invention.

On the basis of the foundation of aforesaid drive method shown in FIG. 2, the present invention further provides a color washout compensation method based on high frequency detection shown in FIG. 7. It is completely understandable to people who are skilled in this field, that the aforesaid color washout compensation method based on high frequency detection also can be applied to other drive methods which is not disclosed by the drive method shown in FIG. 2. The color washout compensation method on the basis of high frequency detection specifically comprises steps below:

step S701: receiving an image to display.

step S702: implementing high frequency detection to the image pixels of the image to display to determine color differences of the respective image pixels and the adjacent image pixels.

The high frequency detection is implemented to the image pixels before employing original gray scale values of respective primary color components of respective image pixels of the image to respectively generate a first display gray scale value and a second display gray scale value. In one frame of image, a high frequency component commonly exists. The high frequency component of the image is the edge of one color district, which refers to the position where the color variation is dramatic. If the difference of the display brightnesses of the display brightnesses of the two display pixels of the corresponded with the respective primary color components of the image pixel belonging to high frequency component is larger, the sawtooth or the fracture can appear more easily to the screen and influence the screen quality. Therefore, for diminishing the sawtooth or the fracture of the screen, by implementing high frequency detection to the image to display in this embodiment, the smoothing process is proceeded against the high frequency component to diminish the sawtooth or the fracture.

Figure 8:
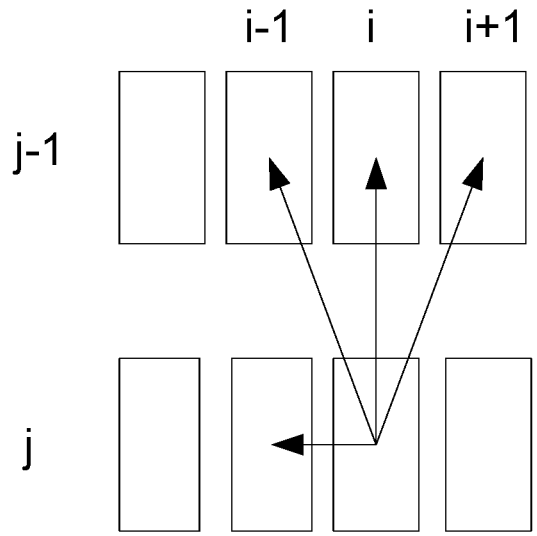
FIG. 8 is a principle diagram of confirming color difference of an image pixel and an adjacent image pixel in one embodiment of the drive system of the liquid crystal display according to the present invention.

Specifically, the step of implementing high frequency detection to the image pixels of the image to display comprises: calculating absolute differences of the original gray scale values of the respective primary color components of the respective image pixels and the adjacent image pixels, and summing the absolute differences to acquire different gray scale sum values for different adjacent image pixels. As an illustration shown in FIG. 8, image pixels of two rows and four columns are indicated in FIG. 8, wherein j represents the row number, and i represents the column number. Therefore, the coordinate (j, i) represents the image pixel in jth row and ith column. Each time, as one image pixel is received, the color difference of the image pixel and the adjacent image pixels around is analyzed. Once the difference is larger, it means that the color variation of the image pixel relative to the adjacent image pixels is larger and has higher possibility to be high frequency component.

The image pixel (j, i) is illustrated. The original gray scale values of the respective primary color components of the image pixel (j, i) are subtracted with the original gray scale values of the respective primary color components of the adjacent image pixel, and then the absolute values are taken and summed. Accordingly, the image pixel (j, i) is determined to be high frequency component or not. The specific calculation formula is below:

$$f1 = |L_{R(j,i)} - L_{R(j,i-1)}| + |L_{G(j,i)} - L_{G(j,i-1)}| + |L_{B(j,i)} - L_{B(j,i-1)}|$$

$$f2 = |L_{R(j,i)} - L_{R(j-1,i)}| + |L_{G(j,i)} - L_{G(j-1,i)}| + |L_{B(j,i)} - L_{B(j-1,i)}|$$

$$f3 = |L_{R(j,i)} - L_{R(j-1,i-1)}| + |L_{G(j,i)} - L_{G(j-1,i-1)}| + |L_{B(j,i)} - L_{B(j-1,i-1)}|$$

$$f4 = |L_{R(j,i)} - L_{R(j-1,i+1)}| + |L_{G(j,i)} - L_{G(j-1,i+1)}| + |L_{B(j,i)} - L_{B(j-1,i+1)}|$$

f1 is the gray scale sum value of the image pixel (j, i) and the adjacent image pixel (j, i−1), and f2 is the gray scale sum value of the image pixel (j, i) and the adjacent image pixel (j−1, i), and f3 is the gray scale sum value of the image pixel (j, i) and the adjacent image pixel (j−1, i−1), and f4 is the gray scale sum value of the image pixel (j, i) and the adjacent image pixel (j−1, i+1). The larger the gray scale sum value of the image pixel and the adjacent image pixel is, it means that the color difference of the image pixel and the adjacent image pixel is larger and tends to be high frequency component.

Therefore, in this embodiment, the maximum gray scale sum value in the gray scale sum values is selected to represent the color difference for determining color difference of the image pixel and the adjacent image pixel. The larger the maximum gray scale sum value is, the color difference is larger. The image pixel tends to be high frequency component more. A gray scale threshold value can be set according to the range of the high frequency components of the image pixels. As the maximum gray scale sum value is larger than the gray scale threshold value, the corresponding image pixel can be determined to be high frequency component.

step S703: respectively setting high frequency weights for the respective image pixels according to the color differences.

After determining the color difference of the image pixel and the adjacent image pixel, high frequency weights are respectively set for the respective image pixels according to the color differences. Different high frequency weights are set for respective image pixels according to the maximum gray scale sum values of the respective image pixels and the adjacent image pixels. The high frequency weight refers to adjustment coefficients for implementing adjustment to ratios of the first display gray scale values and the second display gray scale values of the respective primary color components of the image pixel according to the color references.

step S704: implementing the color washout compensation to the image to display according to the high frequency weight.

In this embodiment, after employing the original gray scale values of the respective primary color components of the respective image pixels of the image to display to respectively generate the first display gray scale value and the second display gray scale value, the high frequency weight is employed to set the ratio of the first display gray scale value and the second display gray scale value, to make that the color difference is larger as the ratio of the first display gray scale value and the second display gray scale value is smaller.

The color difference and the high frequency weight of the image pixel and the adjacent image pixel can be set to be an inverse relationship. The larger the color difference of the image pixel and the adjacent image pixel is, the smaller the high frequency weight of the image pixel is set to be. The smaller the color difference of the image pixel and the adjacent image pixel is, the larger the high frequency weight of the image pixel is relatively set to be. Then, the relationship between the high frequency weight and the ratio of the first display gray scale value and the second display gray scale value is a proportional relationship. The smaller the high frequency weight is, the obtained ratio of the first display gray scale value and the second display gray scale value after employing the high frequency weight to set the ratio of the first display gray scale value and the second display gray scale value is smaller. The difference of the brightness between the display pixel controlled by the first display gray scale value and the display pixel controlled by the second display gray scale value is smaller.

Certainly, in other embodiments, the relationship between the color difference and the high frequency weight of the image pixel and the adjacent image pixel can be set to be a proportional relationship. The larger the color difference of the image pixel and the adjacent image pixel is, the smaller the high frequency weight of the image pixel is set to be. The larger the color difference of the image pixel and the adjacent image pixel is, the larger the high frequency weight of the image pixel is set to be. On the contrary, the high frequency weight is smaller. Then, the relationship between the high frequency weight and the ratio of the first display gray scale value and the second display gray scale value is an inverse relationship. The larger the high frequency weight is, the obtained ratio of the first display gray scale value and the second display gray scale value after employing the high frequency weight to set the ratio of the first display gray scale value and the second display gray scale value is smaller. The difference of the brightness between the display pixel controlled by the first display gray scale value and the display pixel controlled by the second display gray scale value is smaller. On the contrary, the difference is larger.

step S705: driving the liquid crystal panel to show the image to display after the color washout compensation.

After employing the high frequency weight to set the ratio of the first display gray scale value and the second display gray scale value of the respective primary color components, the first display gray scale value and the second display gray scale value are employed to respectively control display brightnesses of two display pixels of the same color on a liquid crystal panel to drive the liquid crystal panel to display.

In this embodiment, as the color difference of the image pixel and the adjacent image pixel is larger, it means that the image pixel tends to be high frequency component. Then, by employing smaller high frequency weight to set the ratio of the first display gray scale value and the second display gray scale value of the respective primary color components, the ratio of the first display gray scale value and the second display gray scale value of the respective primary color components is a smaller value. Thus, the difference of the brightness between the display pixel controlled by the first display gray scale value and the display pixel controlled by the second display gray scale value is smaller. Thereby, the sawtooth or the fracture phenomenon at the position where the color variation is more dramatic can be diminished to make the image smoother.

In other embodiments, other ways can be employed to implement high frequency detection to the image to display. As an illustration, the Roberts edge detection operator, which is well known in this field, the Sobel edge detection operator or the Prewitt edge detection operator for detecting the image pixels which are high frequency components in the image to display. the color differences of the respective image pixels and the adjacent images can be acquired according to the detection result. Accordingly, different high frequency weights are set for the respective image pixels according to the different color differences.

With the aforesaid arrangement, before employing the first display gray scale value and the second display gray scale value to respectively control the display brightnesses of two display pixels of the same color corresponded with the corresponding primary color components, the high frequency weight is employed to set the ratio of the first display gray scale value and the second display gray scale value of the respective primary color components of the respective image pixels to promote the low color washout result in advance.

Figure 9:
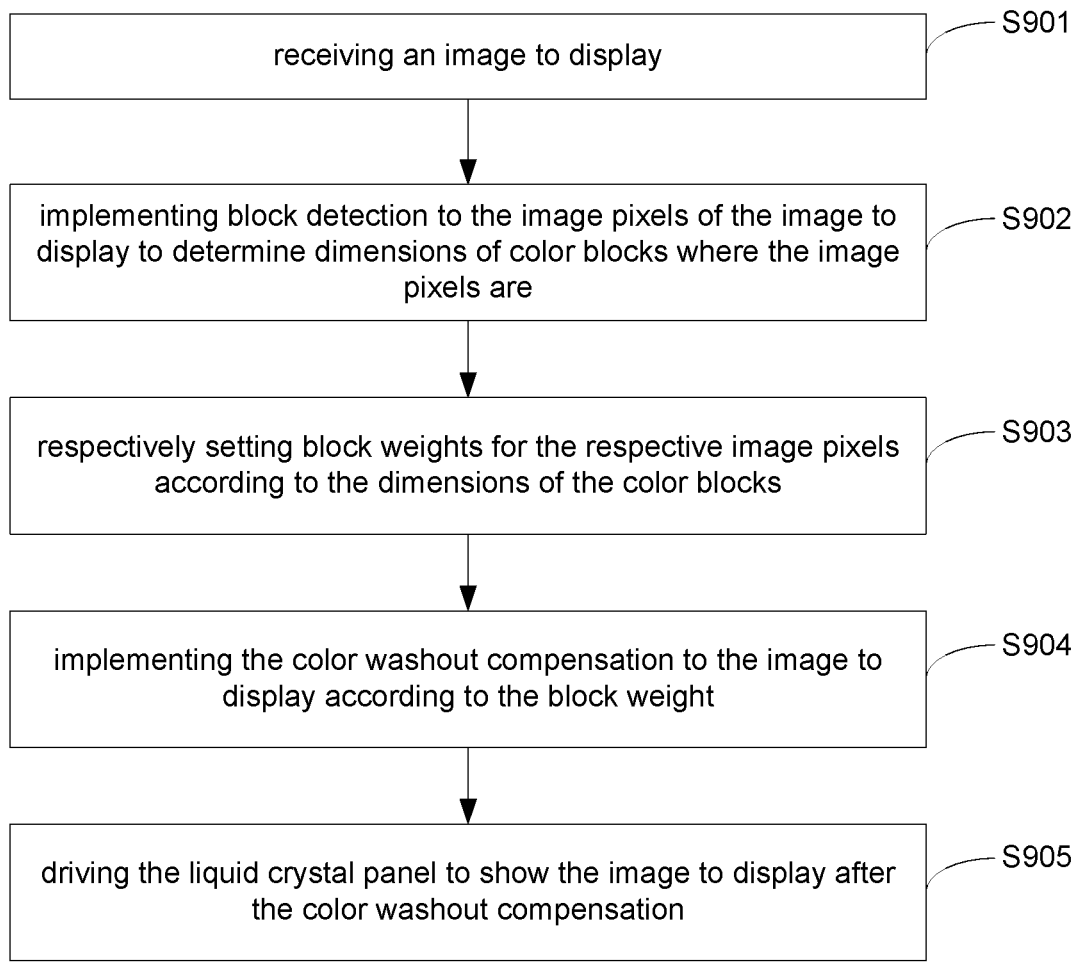
FIG. 9 is a flowchart of a drive method of a liquid crystal display according to another embodiment of the present invention.

On the basis of the foundation of aforesaid drive method shown in FIG. 2, the present invention further provides a color washout compensation method based on block detection shown in FIG. 9. It is completely understandable to people who are skilled in this field, that the aforesaid color washout compensation method based on block detection also can be applied to other drive methods which is not disclosed by the drive method shown in FIG. 9. The color washout compensation method on the basis of block detection specifically comprises steps below:

step S901: receiving an image to display.

step S902: implementing block detection to the image pixels of the image to display to determine dimensions of color blocks where the image pixels are.

The block detection is implemented to the image pixels before employing original gray scale values of respective primary color components of respective image pixels of the image to display to respectively generate a first display gray scale value and a second display gray scale value. The color blocks refer to a sum of continuous image pixels of which the color differences are in a predetermined range and represent the sum of the continuous image pixels of which the colors are the same or similar. The color block can be a color block of one arbitrary color.

In the embodiment of the present invention, the dimensions of the color blocks can be determined according to the edge detection to the color blocks. The edge detection to the color blocks is the high frequency detection. The edge is the position where the color variation is larger. Specifically, the high frequency weight sum value is acquired by summing the high frequency weights of the image pixels in predetermined areas around the respective image pixels. Then, the high frequency weight sum value is employed to represent the dimension of the color block where the image pixel is. For each image pixel, after the high frequency detection in the aforesaid embodiment is implemented, each image pixel has one high frequency weight. In this embodiment, the larger the color difference is, the high frequency weight is set to be smaller. Therefore, in a given predetermined area, as the color block is smaller, the amount of the image pixels constituting the color block is relatively less, and the amount of the image pixels belong to the edge of the color block is relatively more. The amount of the image pixels belong to the high frequency component is more. Therefore, the acquired high frequency weight sum value is smaller. Thus, the high frequency weight sum value can represent the dimension of the color block.

Specifically, as the high frequency weight sum value is smaller, it means that the amount of the image pixels belong to the high frequency component is more. Correspondingly, the amount of the image pixels of the color block where the image pixel is is less. Therefore, the color block where the image pixel is is smaller.

step S903: respectively setting block weights for the respective image pixels according to the dimensions of the color blocks.

As the color block is smaller, i.e. the block area is smaller, the human eyes can sense the granular sensation of the screen more easily if the difference of the brightness between the two display pixels of the same color of the respective primary color components in the color block is larger. Therefore, for diminishing the granular sensation of the screen, in this embodiment, the block weights are respectively set for the respective image pixels according to the dimensions of the color blocks to implement the weight process to the image pixels in a small block.

step S904: implementing the color washout compensation to the image to display according to the block weight.

After employing the original gray scale values of the respective primary color components of the respective image pixels of the image to display to respectively generate the first display gray scale value and the second display gray scale value, the block weight is employed to set the ratio of the first display gray scale value and the second display gray scale value, to make that the color block where the image pixel is is smaller as the ratio of the first display gray scale value and the second display gray scale value is smaller. The ratio of the first display gray scale value and the second display gray scale value is smaller as the high frequency weight sum value is smaller.

As the high frequency weight sum value is smaller, which means that the color block where the image pixel is is smaller, by employing the block weight to set the ratio of the first display gray scale value and the second display gray scale value, the ratio of the first display gray scale value and the second display gray scale value of the respective primary color components is made to be smaller to make the difference of the brightness between the two display pixels of the same color corresponded with the respective primary color components to be smaller. Accordingly, the granular sensation of the screen can be diminished, which is beneficial to promote low color washout result.

The relationship between the block weight and the dimension of the color block can be set to be a proportional relationship. As the color block where the image pixel is is smaller, the block weight set for the image pixel is smaller. On the contrary, the block weight is larger. Then, the relationship between the block weight and the ratio of the first display gray scale value and the second display gray scale value is a proportional relationship. The smaller the block weight is, the ratio of the first display gray scale value and the second display gray scale value acquired by employing the block weight for setting is smaller. On the contrary, the block weight is larger. Certainly, in other embodiment, the relationship between the block weight and the dimension of the color block can be set to be an inverse relationship. As the color block where the image pixel is is smaller, the block weight set for the image pixel is larger. On the contrary, the block weight is smaller. Then, the relationship between the block weight and the ratio of the first display gray scale value and the second display gray scale value is an inverse relationship. The larger the block weight is, the ratio of the first display gray scale value and the second display gray scale value acquired by employing the block weight for setting is smaller. On the contrary, the block weight is larger.

step S905: driving the liquid crystal panel to show the image to display after the color washout compensation.

After employing the block weight to set the ratio of the first display gray scale value and the second display gray scale value of the respective primary color components, the first display gray scale value and the second display gray scale value are employed to respectively control display brightnesses of two display pixels of the same color on a liquid crystal panel to drive the liquid crystal panel to display.

In another embodiment of the present invention, the dimension of the color block also can be determined according to the skin color weight on the basis of skin color detection. Now, the color block is a nude block. For each image pixel, after implementing the skin color detection of the aforesaid embodiment, the image to display comprises nude blocks and non skin color blocks. The nude blocks refer to a sum of the continuous nude pixels of which the color is the same or similar with the skin color. Each image pixel has one skin color weight. In this embodiment, the skin color weight of the nude pixel is larger than the skin color weight of the non skin color pixel. The difference of the brightness between the two display pixels corresponded with the nude pixel is larger than the difference of the brightness between the two display pixels corresponded with the non skin color pixel. Therefore, as the nude pixel is positioned in a smaller nude block, it can easily cause the grid sensation of the human eyes because the difference of the brightness of the display pixel is larger. Thus, in this embodiment, different block weights are set for the image pixels positioned in nude blocks of which the dimensions are different to diminish the grid sensation. The step of implementing block detection to the image pixels of the image to display comprises: summing the skin color weights of the image pixels in predetermined areas around the respective image pixels to acquire skin color weight sum value to acquire the skin color weight sum value, and employing the skin color weight sum value to represent the dimensions of the color blocks where the image pixels are.

Because the skin color weight of the nude pixel is larger than the skin color weight of the non skin color pixel, in a given predetermined area, the larger the nude block where the nude pixels are is larger, the amount of the nude pixels is larger, and the skin color weight sum value is larger; as the nude block where the nude pixels are is smaller, the skin color weight sum value is smaller. Therefore, the skin color weight sum value can be employed to represent the dimension of the nude block where the image pixel is.

The step of the implementing color washout compensation to the image to display comprises: the ratio of the first display gray scale value and the second display gray scale value is smaller as the skin color weight sum value is smaller. As the skin color weight sum value is smaller, it means that the amount of the nude pixels in the predetermined range is less, and the nude block where the nude pixels are is smaller. Thus, the ratio of the first display gray scale value and the second display gray scale value of the respective primary color components is made to be smaller to make the difference of the brightness between the two corresponding display pixels to be smaller. The granular sensation of the screen can be diminished.

A synthetic treatment can be implemented to the skin color weight and the block weight for setting the ratio of the first display gray scale value and the second display gray scale value of the image pixel. In other words, after implementing skin color detection to the image pixel, and determining the skin color weight of the image pixel according to the skin color detection result of the image pixel, detection is implemented to the color block where the image pixel is to determine the block weight of the image pixel according to the dimension of the color block. Then, the synthetic treatment can be implemented to the skin color weight and the block weight to acquire the treatment weight of the image pixel and the treatment weight is employed to set the ratio of the first display gray scale value and the second display gray scale value of the image pixel to make that the ratio of the first display gray scale value and the second display gray scale value of the image pixel simultaneously satisfies the setting demands for the ratio of the first display gray scale value and the second display gray scale value of the image pixel in the skin color detection and the block detection.

Certainly, after employing the skin color weight to set the ratio of the first display gray scale value and the second display gray scale value of the respective image pixels, the block weight can be employed to set the ratio of the first display gray scale value and the second display gray scale value in advance according to the dimension of the nude block where the image pixel is.

Besides, in other embodiments of the present invention, the number of the continuous image pixels of which the color differences are in a predetermined range also can be calculated, i.e. the number of the continuous image pixels of which the colors are the same or similar is calculated. The number of the continuous image pixels is employed to represent the dimension of the color block where the image pixels are. The more the number is, the color block is larger.

Specifically, the skin color detection, the high frequency detection and the block detection in the aforesaid embodiments of the present invention can be independently implemented. Only the skin color detection can be implemented to the image pixel to employ the skin color weight to implement color washout compensation to the image to display. Or, only the high frequency detection can be implemented to the image pixel to employ the high frequency weight to implement color washout compensation to the image to display. Moreover, only the block detection can be implemented to the image pixel to employ the block weight to implement color washout compensation to the image to display. Besides, on the basis of skin color detection, the high frequency detection can be implemented to the nude pixel in advance to weaken the adjustment to the ratio of the first display gray scale value and the second display gray scale value of the nude pixel to make the edge of the nude pixel smoother and to diminish the sawtooth. Or, on the basis of skin color detection, the block detection can be implemented to nude pixel in advance to weaken the adjustment to the ratio of the first display gray scale value and the second display gray scale value of the nude pixel in the smaller nude block. It is beneficial to diminish the granular sensation of the screen. Or, all the skin color detection, the high frequency detection and the block detection are implemented to the image pixels.

As the skin color detection, the high frequency detection and the block detection are selected to be implemented to the image pixel, the adjustment procedure to the ratio of the first display gray scale value and the second display gray scale value is: after detection, the weight synthetic treatment can be implemented to the skin color detection, the high frequency detection and the block detection set to the image pixel. The weight synthetic treatment can be multiplying the three weights to acquire an ultimate treatment weight. The treatment weight is employed to set the ratio of the first display gray scale value and the second display gray scale value of the image pixel. The first display gray scale value and the second display gray scale value after setting are employed to respectively control the display brightnesses of two display pixels of the same color of the image pixel to drive liquid crystal panel thereby.

Figure 10:
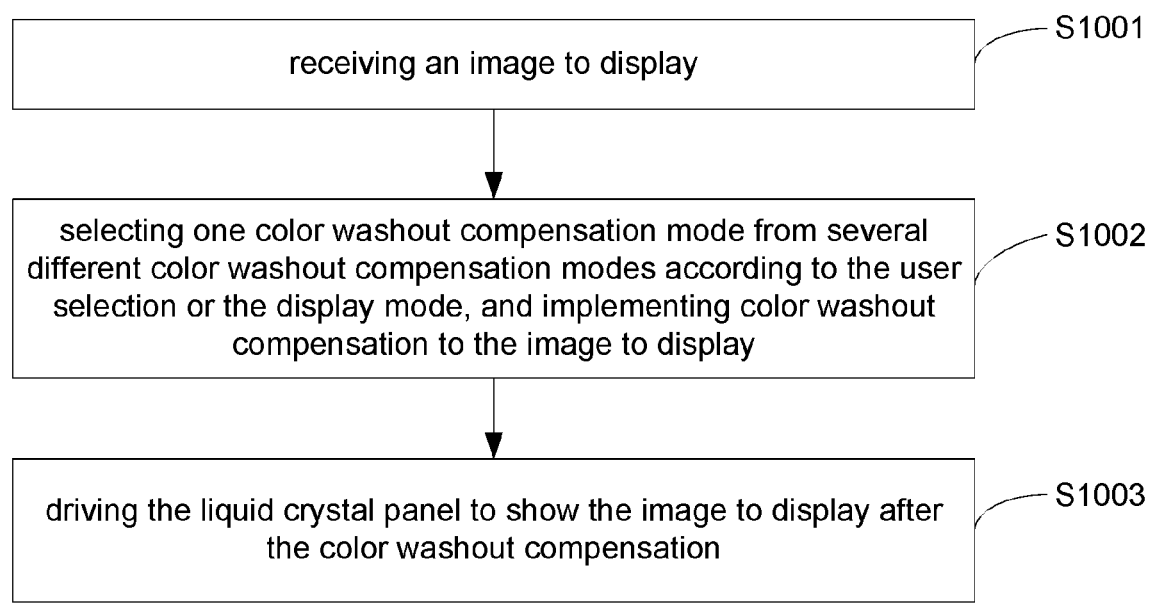
FIG. 10 is a flowchart of a drive method of a liquid crystal display according to another embodiment of the present invention.

Therefore, the present invention further provides a color washout compensation method based on user selection or display mode, specifically shown in FIG. 10:

step S1001: receiving an image to display.

step S1002: selecting one color washout compensation mode from several different color washout compensation modes according to the user selection or the display mode, and implementing color washout compensation to the image to display.

step S1003: driving the liquid crystal panel to show the image to display after the color washout compensation.

The color washout compensation mode specifically refers to the color washout compensation modes described in any aforesaid embodiments, comprising three kinds of color washout compensations below: the color washout compensation way employing the skin color weight to implement color washout compensation to the image pixel, the color washout compensation way employing the high frequency weight to implement color washout compensation to the image pixel and the color washout compensation way employing the block weight to implement color washout compensation to the image pixel. The specific implement procedure of the aforesaid three color washout compensation ways can be executed by referring the aforesaid embodiments. The repeated descriptions are omitted here.

The several different color washout compensation modes are different color washout compensation ways or combinations of the different color washout compensation ways selected from the three aforesaid color washout compensation ways. Or, different settings are implemented to at least one of the skin color weight, the high frequency weight and the block weight. The color washout compensation can be implemented by selecting one of the three aforesaid color washout compensation ways according to the user selection or the display mode. Or, the color washout compensation can be implemented by selecting arbitrary combinations of the three aforesaid color washout compensation ways. As an arbitrary combination of the color washout compensation ways is selected to implement the color washout compensation to the image to display, the synthetic treatment can be implemented to the weights corresponded with the respective color washout compensation ways. The weight after synthetics is employed to set the ratio of the first display gray scale value and the second display gray scale value of the respective primary color components in the image to display to realize the color washout compensation to the image to display.

The display modes comprise movie watch mode, menu operation mode and webpage browse mode. The watch angle and the watch distance of the user under different display modes are different. The watch angle and the watch distance have certain influence to the watch result.

As regarding the movie watch mode, the audiences are many in general and watch from different angles and with farther distances. Under this mode, the demand to the view angle of the liquid crystal display is higher. Therefore, as the display mode is the movie watch mode, only the high frequency weight can be selected to be the color washout compensation way for implementing the color washout compensation to the image pixel to implement the color washout compensation to the image to display. Thus, under the compensation way, the ratio of the first display gray scale value and the second display gray scale value of the image pixel of high frequency component is set to be smaller. The ratio of the first display gray scale value and the second display gray scale value of the rest image pixels is set to be relatively larger to obtain the better display result.

Certainly, in other embodiments, under this mode, the three aforesaid color washout compensation ways can be simultaneously selected to implement the color washout compensation to the image under the display mode. Or, any two or one color washout compensation way can be selected to implement the color washout compensation to the image under the display mode. Specifically, the setting can be executed according to the actual application condition. No specific limitation is claimed here.

As regarding the menu operation mode, under this mode, the user is closer to the liquid crystal display, and the view angle is smaller, and there must be a certain demand to the details. Thus, for diminishing the granular sensation or the sawtooth phenomenon, the three aforesaid color washout compensation ways can be simultaneously selected to implement the color washout compensation to the image under the display mode for diminishing the granule of the screen and the sawtooth phenomenon to promote the detail quality of the screen. Certainly, in other ways, other different color washout compensation ways or different combination of the color washout compensation ways can be selected to process the image to display.

As regarding the webpage browse mode, under this mode, the user is also closer to the liquid crystal display, and there is higher demand to the details, and the demand to the resolution is the highest, and the watch view angle is smaller. Thus, the aforesaid color washout compensation ways can be omitted to implement the color washout compensation to the image to display. Certainly, one or few of the aforesaid color washout compensation ways can be selected to process according to demands.

Besides, in other embodiments, the user can spontaneously select the color washout compensation mode. The user can input the preset instructions. Each instruction corresponds to one color washout compensation mode. As the user selects one instruction. The corresponding color washout compensation mode is selected according to the user selection to implement the color washout process. Moreover, the position of the user can be dynamically detected. Different color washout compensation ways can be selected according to the different positions of the user to implement the color washout process.

Specifically, the color washout compensation ways described in the aforesaid embodiments of the present invention are similarly applied to the pixels of other predetermined colors for implementing color washout compensation.

Figure 11:
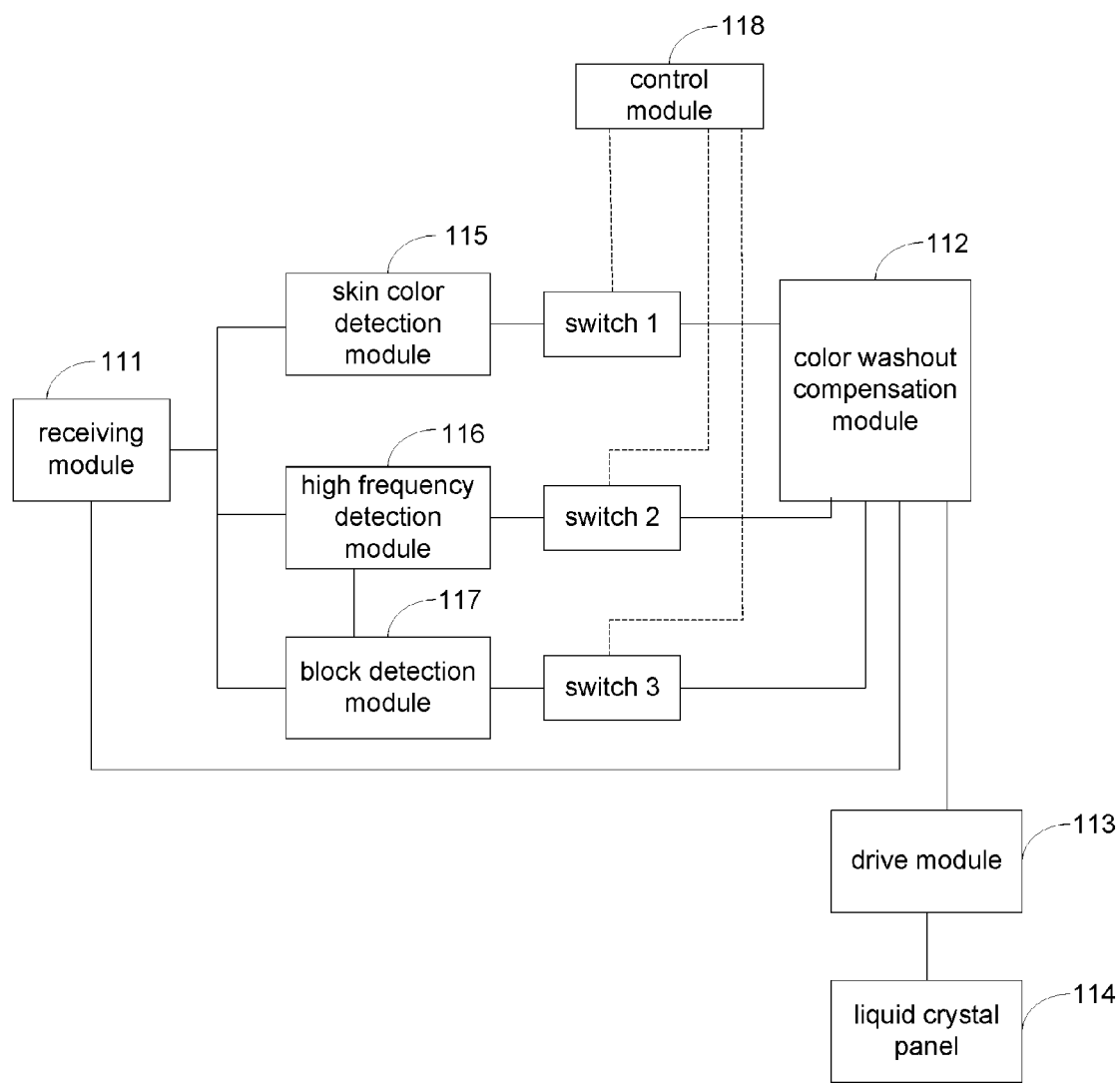
FIG. 11 is a structural diagram of a drive device of a liquid crystal display according to one embodiment of the present invention.

Please refer to FIG. 11. In one embodiment of the drive device of the liquid crystal display according to the present invention, the drive device comprises a receiving module 111, a color washout compensation module 112 and a drive module 113. The receiving module 111 is employed for receiving an image to display. The color washout compensation module 112 employs the original gray scale values of the respective primary color components of the respective image pixels of the image to display to respectively generate the first display gray scale value and the second display gray scale value. The drive module 113 employs the first display gray scale value and the second display gray scale value to respectively control display brightnesses of two display pixels of the same color on a liquid crystal panel 114. The first display gray scale value is larger than the second display gray scale value.

In this embodiment and in the pixel structure of the liquid crystal panel, two display pixels are employed to realize the display brightness of one primary color component. That is to say, the display brightness of each primary color component is the mixture of the display brightnesses of two display pixels on the liquid crystal panel. The two display pixels refer to two independent pixels spatially arranged on the liquid crystal panel. The display pixel is a display unit defined by respective color resist units. The color resist units comprise a red resist unit, a green resist unit and a blue resist unit. The display pixel correspondingly comprises a red display pixel, a green display pixel and a blue display pixel. Therefore, each primary color component respectively corresponds to two display pixels of the same color. Specifically, in one image pixel, the red component corresponds to two red display pixels, and the green component corresponds to two green display pixels, and the blue component corresponds to two blue display pixels. The two display pixels of the same color of the same primary color component are mutually independent. The display pixels of different colors of the different primary color components are independent to one another, too.

The first display gray scale value generated by the color washout compensation module 112 with the original gray scale value is larger than the second display gray scale value. Thus, as the drive module 113 employs the first display gray scale value and the second display gray scale value to respectively control the display brightnesses of the two corresponding display pixels of the same color, the drive voltages applied to the two display pixels are different to twist the liquid crystal molecules of respective display pixels in different angles. Accordingly, the better watch result can be obtained anyway as watching the frame of the image from different angles to achieve the objective of reducing the color washout. Besides, the two display pixels of the same color corresponding to respective primary color component are display units which are mutually independent, and thus are capable of independently controlling the brightnesses of respective display pixels to allow the display brightnesses of respective display pixels to change between 0-255. It is beneficial for promoting the aperture ratio of the liquid crystal panel.

The color washout compensation module 112 is further employed to set a sum of the display brightness corresponded with the first display gray scale value and the display brightness corresponded with the second display gray scale value as being twice of display brightness corresponded with the original display gray scale value. In this embodiment, the display brightness of each primary color component is a half of the sum of the display brightnesses of the two corresponding display pixels of the same color.

The color washout compensation module 112 is further employed to set the ratio of the first display gray scale value and the second display gray scale value of different primary color components of the same image pixel to be different to promote the low color washout result.

The drive module 113 is specifically employed for controlling at least two display pixels on the liquid crystal panel controlled by at least two first display gray scale values to be adjacently aligned along the row direction or the column direction. The display pixel controlled by the first display gray scale value which is larger has brighter display brightness. The display pixel controlled by the second display gray scale value which is smaller has darker display brightness. Therefore, the respective display units on the liquid crystal panel appear to be bright, dark alignment. In this embodiment, the display pixels in two primary color components which has brighter display brightness are adjacently aligned in the row direction. As shown in FIG. 3, the red component R of one image pixel corresponds to two display pixels R1, R2 of the same color, wherein the first display gray scale value of the red component R controls the display brightness of the display pixel R1, and the second display gray scale value of the red component R controls the display brightness of the display pixel R2; the green component G corresponds to two display pixels G1, G2 of the same color, wherein the first display gray scale value of the green component G controls the display brightness of the display pixel G1, and the second display gray scale value of the green component G controls the display brightness of the display pixel G2; the blue component B corresponds to two display pixels B1, B2 of the same color, wherein the first display gray scale value of the blue component B controls the display brightness of the display pixel B1, and the second display gray scale value of the blue component B controls the display brightness of the display pixel B2. As shown in FIG. 3, in the row direction, the two brighter display pixels respectively corresponding to the two primary color components are adjacently aligned, and the two darker display pixels are adjacently aligned, too. Besides, two brighter display pixels and two darker display pixels are alternately aligned.

With the aforesaid alignment, it is beneficial to promote low color washout result under large view angle in comparison with the alignment that one is bright and one is dark. Certainly, in other embodiments, the brighter display pixels respectively corresponding to the three or more primary color components can be controlled to be adjacently aligned in the row direction or in the column direction.

Besides, in the embodiment of the drive device according to the present invention, the drive device further comprises a skin color detection module 115, a high frequency detection module 116 and a block detection module 117. The skin color detection module 115 is employed for implementing skin color detection to the image pixels of the image to display to determine nude pixel and non skin color pixel, and setting different skin color weights for the nude pixel and the non skin color pixel before the color washout compensation module 112 employs the original gray scale values of the respective primary color components of the respective image pixels of the image to display to respectively generate the first display gray scale value and the second display gray scale value. Accordingly, the treatment weights of the image pixels of different colors are determined.

The skin color detection module 115 is specifically employed for acquiring original gray scale values LR, LG, LB of red, green, blue, three primary colors of the respective image pixels, and then determining if the original gray scale values LR, LG, LB of red, green, blue, three primary colors satisfy the condition, LR>LG>LB, and as the condition is met, the image pixel meeting the condition is defined to be a nude pixel, otherwise, is defined to be a non skin color pixel. Consequently, the skin color detection to the image pixel is realized.

Certainly, in other embodiments, the human face detection technology or other image process technologies can be utilized for detecting the nude pixels in the image to display.

After the skin color detection module 115 sets different skin color weights fir the nude pixel and the non skin color pixel, the color washout compensation module 112 employs the skin color weight to set the ratio of the first display gray scale value and the second display gray scale value to make the ratio of the first display gray scale value and the second display gray scale value of the nude pixel larger than a ratio of the first display gray scale value and the second display gray scale value of the non skin color pixel.

In this embodiment, the relationship between the skin color weight and the ratio of the first display gray scale value and the second display gray scale value is a proportional relationship. The larger the skin color weight is, the obtained ratio of the first display gray scale value and the second display gray scale value after employing the skin color weight to set the ratio of the first display gray scale value and the second display gray scale value is larger. Accordingly, the difference of the brightness between the display pixel controlled by the first display gray scale value and the display pixel controlled by the second display gray scale value is larger. On the contrary, the smaller the skin color weight is, the difference is smaller. The skin color weight of the nude pixel is set to be larger than the skin color weight of the non skin color pixel. Thus, the ratio of the first display gray scale value and the second display gray scale value of the nude pixel is larger than the ratio of the first display gray scale value and the second display gray scale value of the non skin color pixel to make that the difference of the display brightnesses of the two display pixels of the same color respectively corresponded with the respective primary color components of the nude pixel larger than the difference of the display brightnesses of the two display pixels of the same color respectively corresponded with the respective primary color components of the non skin color pixel. Thereby, it is beneficial to promote low color washout result.

Because the human eyes have higher sensitivity to the skin color. Even smaller color washout occurs to the skin color, the human eyes can become aware of the color change of the skin color very easily. Thus, once the color washout occurs to the skin color, even the color washout is smaller, the human eyes can become aware of the color distortion of the image very easily. Therefore, in this embodiment, before employing the first display gray scale value and the second display gray scale value to respectively control the display brightnesses of two display pixels of the same color corresponded with the corresponding primary color components, the larger skin color weight is employed to set the ratio of the first display gray scale value and the second display gray scale value of the respective primary color components to implement the color washout compensation to the nude image in the image to display for acquiring better low color washout result.

In the embodiment of the drive device according to the present invention, before the color washout compensation module 112 employs the original gray scale values of the respective primary color components of the respective image pixels of the image to display to respectively generate the first display gray scale value and the second display gray scale value, the color washout compensation module 112 is further employed for implementing adjustment to the original gray scale values of the respective primary color components of the nude pixel to make that a difference between a relatively higher original gray scale value and a relatively lower original gray scale value before adjustment becomes larger after adjustment for the same nude pixel. Thereby, in the same nude pixel, the difference of the brightness between the primary color component with the relatively higher original gray scale value and the primary color component with the relatively lower original gray scale value becomes larger in advance to raise the brightness contrast of the respective primary color components. Accordingly, the color washout process result of the nude block can be better to promote the low color washout result.

The high frequency detection module 116 is employed for implementing high frequency detection to the image pixels of the image to display to determine the color differences of the respective image pixels and the adjacent image pixels, and setting high frequency weights for the respective image pixels before the color washout compensation module 112 employs the original gray scale values of the respective primary color components of the respective image pixels of the image to display to respectively generate the first display gray scale value and the second display gray scale value.

Specifically, the high frequency detection module 116 is employed for calculating absolute differences of the original gray scale values of the respective primary color components of the respective image pixels and the adjacent image pixels, and summing the absolute differences to acquire different gray scale sum values for different adjacent image pixels, and selecting the maximum gray scale sum value in the gray scale sum values to represent the color difference. Thereby, the color differences of the respective image pixels and the adjacent image pixels can be determined according to the maximum gray scale sum value. The larger the maximum gray scale sum value is, it means that the color difference is larger. The image pixel tends to be high frequency component more.

The high frequency detection module 116 respectively sets the high frequency weights for the respective image pixels according to the color differences. Different high frequency weights are set for respective image pixels according to the maximum gray scale sum values of the respective image pixels and the adjacent image pixels. After determining the high frequency weight of each image pixel, the color washout compensation module 112 employs the high frequency weight to set the ratio of the first display gray scale value and the second display gray scale value, to make that the color difference is larger as the ratio of the first display gray scale value and the second display gray scale value is smaller.

The color difference and the high frequency weight of the image pixel and the adjacent image pixel can be set to be an inverse relationship. The larger the color difference of the image pixel and the adjacent image pixel is, the smaller the high frequency weight of the image pixel is set to be. The smaller the color difference of the image pixel and the adjacent image pixel is, the larger the high frequency weight of the image pixel is relatively set to be. Then, the relationship between the high frequency weight and the ratio of the first display gray scale value and the second display gray scale value is a proportional relationship. The smaller the high frequency weight is, the obtained ratio of the first display gray scale value and the second display gray scale value after employing the high frequency weight to set the ratio of the first display gray scale value and the second display gray scale value is smaller. The difference of the brightness between the display pixel controlled by the first display gray scale value and the display pixel controlled by the second display gray scale value is smaller.

Therefore, as the color difference of the image pixel and the adjacent image pixel is larger, it means that the image pixel tends to be high frequency component. Then, by employing smaller high frequency weight to set the ratio of the first display gray scale value and the second display gray scale value of the respective primary color components, the ratio of the first display gray scale value and the second display gray scale value of the respective primary color components is a smaller value. Thus, the difference of the brightness between the display pixel controlled by the first display gray scale value and the display pixel controlled by the second display gray scale value is smaller. Thereby, the sawtooth or the fracture phenomenon at the position where the color variation is more dramatic can be diminished to make the image smoother.

The block detection module 117 is employed for implementing block detection to the image pixels of the image to display to determine the dimension of the color block where the image pixel is, and setting block weights for the respective image pixels according to the dimensions of the color blocks before the color washout compensation module 112 employs the original gray scale values of the respective primary color components of the respective image pixels of the image to display to respectively generate the first display gray scale value and the second display gray scale value. The color blocks refer to a sum of continuous image pixels of which the color differences are in a predetermined range and represent the sum of the continuous image pixels of which the colors are the same or similar. The color block can be a color block of one arbitrary color.

After the block detection module 117 sets block weights for the respective image pixels according to the dimensions of the color blocks where the image pixels are, the color washout compensation module 112 employs the block weights to set the ratio of the first display gray scale value and the second display gray scale value, to make that the color block where the image pixel is is smaller as the ratio of the first display gray scale value and the second display gray scale value is smaller.

As the color block where the image pixel is is smaller, by employing the block weight to set the ratio of the first display gray scale value and the second display gray scale value, the ratio of the first display gray scale value and the second display gray scale value of the respective primary color components is made to be smaller to make the difference of the brightness between the two display pixels of the same color corresponded with the respective primary color components to be smaller. Accordingly, the granular sensation of the screen can be diminished, which is beneficial to promote low color washout result.

The relationship between the block weight and the dimension of the color block can be set to be a proportional relationship. As the color block where the image pixel is is smaller, the block weight set for the image pixel is smaller. On the contrary, the block weight is larger. Then, the relationship between the block weight and the ratio of the first display gray scale value and the second display gray scale value is a proportional relationship. The smaller the block weight is, the ratio of the first display gray scale value and the second display gray scale value is smaller. On the contrary, the block weight is larger.

The block detection module 117 can determine the dimensions of the color blocks according to the edge detection to the color blocks. The edge detection to the color blocks is the high frequency detection. The edge is the position where the color variation is larger. Specifically, the block detection module 117 is employed for summing the high frequency weights of the image pixels in predetermined areas around the respective image pixels to acquire the high frequency weight sum value. Then, the high frequency weight sum value is employed to represent the dimension of the color block where the image pixel is. For each image pixel, after the high frequency detection module 116 implements the high frequency detection, each image pixel has one high frequency weight. In this embodiment, the larger the color difference is, the high frequency weight is set to be smaller. Therefore, in a given predetermined area, as the color block is smaller, the amount of the image pixels constituting the color block is relatively less, and the amount of the image pixels belong to the edge of the color block is relatively more. The amount of the image pixels belong to the high frequency component is more. Therefore, the acquired high frequency weight sum value is smaller. Thus, the high frequency weight sum value can represent the dimension of the color block.

The color washout compensation module 112 is specifically employed to make that the ratio of the first display gray scale value and the second display gray scale value is smaller as the high frequency weight sum value is smaller. As the high frequency weight sum value is smaller, it means that the amount of the image pixels belong to the high frequency component is more. Correspondingly, the amount of the image pixels of the color block where the image pixel is is less. Therefore, the color block where the image pixel is is smaller. Then, As the dimension of the color block where the image pixel is is smaller, the ratio of the first display gray scale value and the second display gray scale value of the primary color component is made to be smaller to make the difference of the brightness between the two corresponding display pixels to be smaller. The granular sensation of the screen caused by the small area color block can be diminished.

Besides, in other embodiments, the block detection module 117 can further determine the dimension of the color block also according to the skin color weight on the basis of skin color detection. Now, the color block is a nude block. Specifically, the block detection module 117 is employed for summing the skin color weights of the image pixels in predetermined areas around the respective image pixels to acquire the skin color weight sum value, and employing the skin color weight sum value to represent the dimensions of the color blocks where the image pixels are.

Because the skin color weight of the nude pixel is larger than the skin color weight of the non skin color pixel, in a given predetermined area, the larger the nude block where the nude pixels are is larger, the amount of the nude pixels is larger, and the skin color weight sum value is larger; as the nude block where the nude pixels are is smaller, the skin color weight sum value is smaller. Therefore, the skin color weight sum value can be employed to represent the dimension of the nude block where the image pixel is. Then, as the color washout compensation module 112 is employed to make the ratio of the first display gray scale value and the second display gray scale value of the nude pixel be smaller as the skin color weight is smaller. As the skin color weight sum value is smaller, it means that the amount of the nude pixels in the predetermined range is less, and the nude block where the nude pixels are is smaller. Thus, the ratio of the first display gray scale value and the second display gray scale value of the respective primary color components is made to be smaller to make the difference of the brightness between the two corresponding display pixels to be smaller. The granular sensation of the screen can be diminished.

Besides, in other embodiments of the present invention, the block detection module 117 also can calculate the number of the continuous image pixels of which the color differences are in a predetermined range, i.e. the number of the continuous image pixels of which the colors are the same or similar. The number of the continuous image pixels is employed to represent the dimension of the color block where the image pixels are.

Please continue to refer to FIG. 11. In this embodiment, the drive device further comprises a control module 118 and a plurality of switches. The skin color detection module 115 is coupled to the color washout compensation module 112 via the switch 1. The high frequency detection module 116 is coupled to the color washout compensation module 112 via the switch 2. The block detection module 117 is coupled to the color washout compensation module 112 via the switch 3. The control module 118 is employed to control the on and off of the switch 1, switch 2 and the switch 3. Therefore, in this embodiment, with the control function of the control module 118 to the switches, only the skin color detection can be selected to be implemented to the image pixel to employ the skin color weight to implement color washout compensation to the image to display. Or, only the high frequency detection can be selected to be implemented to the image pixel to employ the high frequency weight to implement color washout compensation to the image to display. Moreover, only the block detection can be selected to be implemented to the image pixel to employ the block weight to implement color washout compensation to the image to display. Certainly, the several color washout compensation ways can be simultaneously selected to be implemented to the image to display.

Furthermore, the drive device also can select one color washout compensation mode from several color washout compensation modes according to the user selection or the display mode, and implement the color washout compensation to the image to display. The color washout compensation ways of the color washout compensation 112 to the image to display comprises three kinds below: the color washout compensation way employing the skin color weight to implement color washout compensation to the image pixel, the color washout compensation way employing the high frequency weight to implement color washout compensation to the image pixel and the color washout compensation way employing the block weight to implement color washout compensation to the image pixel. The several different color washout compensation modes are different color washout compensation ways or combinations of the different color washout compensation ways selected from the three aforesaid color washout compensation ways. Or, different settings are implemented to at least one of the skin color weight, the high frequency weight and the block weight.

Specifically, the control module 118 control the on and off of different switches according to the user selection or the display mode. As one switch is conducted, such as the switch 1 is conducted, and the other switches are disconnected. Then, the color washout compensation 112 implements the color washout compensation to the image to display according to the skin color weights for the respective image pixels set by the skin color detection module 115.

The display modes comprise movie watch mode, menu operation mode and webpage browse mode. The watch angle and the watch distance of the user under different display modes are different. The watch angle and the watch distance have certain influence to the watch result.

As the display mode is the movie watch mode, the control module 118 can control the switch 1 and the switch 3 to be off and the switch 2 to be on to make that the color washout compensation 112 implements the color washout compensation to the image to display according to the high frequency weights for the respective image pixels set by the high frequency detection module 117. As the display mode is the menu operation mode, the control module 118 can control all of the switches to be conducted to make that the color washout compensation 112 employs the skin color weight, the high frequency weight and the block weight to implement the color washout compensation. As the display mode is the webpage browse mode, the control module 118 can control all of the switches to be off. None of the aforesaid color washout compensation ways is employed for implementing the color washout compensation to the image pixel.

Certainly, the control module 118 can control the corresponding switches to be conducted or disconnected according to the user selection to make that the color washout compensation 112 employs the corresponding color washout compensation mode to implement the color washout compensation.

Specifically, the drive devices described in the aforesaid embodiments of the present invention are similarly adaptable to the pixels of other predetermined colors for implementing color washout compensation.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A drive method of a liquid crystal display, wherein the drive method comprises:
    receiving an image to display;
    implementing block detection to the image pixels of the image to display to determine dimensions of color blocks where the image pixels are;
    respectively setting block weights for the respective image pixels according to the dimensions of the color blocks;
    implementing the color washout compensation to the image to display according to the block weight;
    driving the liquid crystal panel to show the image to display after the color washout compensation;
    wherein the step of implementing color washout compensation to the image to display according to the block weight comprises:
    employing the original gray scale values of the respective primary color components of the respective image pixels of the image to display to respectively generate the first display gray scale value and the second display gray scale value, wherein the first display gray scale value and the second display gray scale value are employed to respectively control display brightnesses of two display pixels of the same color on the liquid crystal panel, and the first display gray scale value is larger than the second display gray scale value, wherein the block weights are employed to set the ratio of the first display gray scale value and the second display gray scale value, to make that the ratio of the first display gray scale value and the second display gray scale value is smaller as the color block is smaller.

2. The drive method according to claim 1, wherein before the step of driving the liquid crystal panel to show the image to display after the color washout compensation, the method further comprises:
    implementing skin color detection to the image pixels of the image to display to determine nude pixel and non skin color pixel;
    setting different skin color weights for the nude pixel and the non skin color pixel;
    implementing color washout compensation to the image to display according to the skin color weights, wherein the skin color weights are employed to set the ratio of the first display gray scale value and the second display gray scale value, to make a ratio of the first display gray scale value and the second display gray scale value of the nude pixel larger than a ratio of the first display gray scale value and the second display gray scale value of the non skin color pixel.

3. The drive method according to claim 2, wherein the step of implementing skin color detection to the image pixels of the image to display comprises:
    acquiring original gray scale values of red, green, blue, three primary colors of the respective image pixels;
    the image pixels satisfying the following equation are defined to be nude pixels, and the image pixels not satisfying the following equation are defined to be non skin color pixels:

$$LR>LG>LB,$$

wherein LR, LG, LB respectively are the original gray scale values of the red, green, blue, three primary colors.

4. The drive method according to claim 2, wherein the step of implementing color washout compensation to the image to display according to the skin color weight comprises:

setting a ratio of the first display gray scale value and the second display gray scale value of different primary color components of the same nude pixel as being different.

5. The drive method according to claim 2, wherein before the step of driving the liquid crystal panel to show the image to display after the color washout compensation, the method further comprises:

implementing high frequency detection to the image pixels of the image to display to determine color differences of the respective image pixels and the adjacent image pixels;

respectively setting high frequency weights for the respective image pixels according to the color differences;

employing the high frequency weights to implement color washout compensation to the image to display, wherein the high frequency weights are employed to set the ratio of the first display gray scale value and the second display gray scale value, to make that the ratio of the first display gray scale value and the second display gray scale value is smaller as the color difference is larger.

6. The drive method according to claim 5, wherein the step of implementing high frequency detection to the image pixels of the image to display comprises:

calculating absolute differences of the original gray scale values of the respective primary color components of the respective image pixels and the adjacent image pixels, and summing the absolute differences to acquire different gray scale sum values for different adjacent image pixels;

selecting the maximum gray scale sum value in the gray scale sum values to represent the color difference.

7. The drive method according to claim 5, wherein the step of implementing block detection to the image pixels of the image to display comprises:

summing the skin color weights or the high frequency weights of the image pixels in predetermined areas around the respective image pixels to acquire weight sum value, and employing the weight sum value to represent the dimensions of the color blocks where the image pixels are.

8. The drive method according to claim 7, wherein the color skin weight of the nude pixel is larger than the color skin weight of the non skin color pixel, and the high frequency weight is smaller as the color difference is larger;

the step of implementing color washout compensation to the image to display according to the block weight comprises:

the ratio of the first display gray scale value and the second display gray scale value is smaller as the weight sum value is smaller.

\* \* \* \* \*